United States Patent [19]

Perry et al.

[11] 3,915,410

[45] Oct. 28, 1975

[54] TAPE CASSETTE TRANSPORT DRIVE MECHANISM WITH COATED DRIVE SHAFT

[75] Inventors: Donald S. Perry, Saratoga; Coleman Pettit, San Jose, both of Calif.

[73] Assignee: Trendata Corporation, Sunnyvale, Calif.

[22] Filed: Dec. 3, 1973

[21] Appl. No.: 421,163

[52] U.S. Cl. .................... 242/201; 74/215; 242/203
[51] Int. Cl.².. G03B 1/04; G11B 15/32; G01F 1/20
[58] Field of Search......... 242/200-204, 197, 198; 74/214-216, 229

[56] References Cited

UNITED STATES PATENTS

| | | | |
|---|---|---|---|
| 3,133,710 | 5/1964 | Herterich | 242/201 |
| 3,168,773 | 2/1965 | Frye | 74/215 |
| 3,258,215 | 6/1966 | Ono | 242/197 |
| 3,612,432 | 10/1971 | Johnson | 242/198 |

*Primary Examiner*—Leonard D. Christian
*Attorney, Agent, or Firm*—Daniel J. Meaney, Jr.

[57] ABSTRACT

A drive mechanism adapted for use in a magnetic tape cassette transport having a driven wheel with a yieldable resilient material formed on its periphery and a drive shaft having a thin, high durometer resilient material coated thereon which engages and positively rotates the driven wheel with a driving force transmitted from the drive shaft to the driven wheel through the thin, high durometer resilient material and the yieldable resilient material drive interface.

11 Claims, 5 Drawing Figures

TAPE CASSETTE TRANSPORT DRIVE MECHANISM WITH COATED DRIVE SHAFT

BACKGROUND OF THE INVENTION

1. Field of the Invention

This invention relates to a novel and improved drive mechanism, and, in particular, to a drive mechanism having a drive shaft coated with a thin, high durometer resilient material and a driven wheel having a yieldable resilient material on its periphery, which wheel is driven by the coated drive shaft.

2. Description of the Prior Art

It is known in the prior art to have a tape drive mechanism formed of a rotating capstan having a coated periphery, which capstan directly engages and transports a magnetic tape. In such known mechanisms, the periphery of the coated capstan directly contacts the non-magnetic surface of a magnetic tape. Positive movement of the tape is obtained by means of a pinch roller which is positioned opposite the capstan hub with the magnetic tape passing therebetween. The pinch roller engages the magnetic surface squeezing the tape between the pinch roller and capstan. As the capstan is rotated, the coating thereon removably engages the non-magnetic surface of the tape and positively transports the tape in a predetermined direction.

Use of a coated capstan to directly engage and transport a magnetic tape has several disadvantages. Certain tape handling apparatus require a separate tape spool drive mechanism to rotate the supply and take-up spools. In such apparatus a separate controlled drive mechanism is required for the tape spools.

Alternatively, the magnetic tape itself may directly provide the driving force for rotating the supply and take-up reels thereby eliminating the need for a separate spool drive mechanism. However, by exerting a lateral tension force or stretching force on the tape, the tape may be subject to elongation. Thus, the tape itself is subject to both the transporting force, which is directly applied to the tape by the pinch roller/capstan drive mechanism, and the lateral tension force, which is indirectly exerted on the tape and equals the rotational force required for rotating the take-up and supply reels.

It is also known in the prior art to form or cast a yieldable resilient material on the periphery of driven wheels, pinch rollers or tape guides adapted for use in tape handling apparatus. Further, known magnetic tape cassette transports utilize a drive mechanism formed of a driven wheel having its periphery formed of a yieldable resilient material and a metal drive shaft which releasably engages and rotates the driven wheel through the metal-resilient material friction drive interface. One example of such drive mechanism is disclosed in U.S. Pat. No. 3,612,432.

In a magnetic cassette transport as described above, a metal/yieldable resilient material drive interface has serious disadvantages. One disadvantage is that the constant driving contact between the metal drive shaft and yieldable resilient material causes a shiny hard surface to be formed on the resilient material surface. During the rotation, the metal drive shaft polishes the resilient material surface resulting in a significant reduction of friction therebetween. After a period of time, the surface of the resilient material becomes so polished and smooth that the surface friction thereof becomes such a low value that the rotating drive shaft is unable to grip and exert a driving force on the yieldable resilient material to rotate the driven wheel.

In addition, grease, dust and other impurities become embedded on the surface of the yieldable resilient material. Such impurities act as lubricants on the polished surface. This results in a tape drive mechanism which is unreliable and which introduces time base errors into the tape recording scheme due to slippage and irregular tape driving speeds. Further, the surface of the yieldable resilient material must be continually cleaned, degreased and/or abraded to maintain a high coefficient of friction thereon to effect sufficient driving friction between the metal drive shaft and the surface of the yieldable resilient material on the periphery of the driven wheel.

Several techniques have been unsuccessfully attempted to overcome the disadvantages of the metal yieldable resilient material drive interface problems of the prior art. Such techniques include mechanically knurling the drive shaft surface or forming an irregular pattern on the drive shaft surface by tumbling the drive shaft in a tumbling apparatus. Also, use of an O-ring formed of a special material such as, for example, natural rubber, either separately or in combination with a roughened drive shaft surface did not overcome the problem of a shiny or polished surface forming on the metal/yieldable resilient material interface.

SUMMARY OF THE INVENTION

The present invention relates to a drive mechanism adapted for use in a magnetic tape transport. The preferred embodiment of the present invention is as a drive mechanism for a magnetic tape cassette transport. Typically such a tape cassette transport has a pair of spaced aligned drive hubs adapted to make driving engagement with tape spools in the tape cassette. The drive mechanism of the present invention includes a driven wheel, which is operationally coupled to one of the two hubs, which driven wheel has a yieldable resilient material around its periphery. A drive shaft having a thin, high durometer resilient material coated thereon is positioned relative to the driven wheel and removably engages the surface of the yieldable resilient material. As the coated drive shaft is rotated, a driving force is transmitted from the coated surface to the surface of the yieldable resilient material rotating the driven wheel and the hub connected to the driven wheel.

The present invention overcomes certain of the disadvantages of the prior art. The drive mechanism of the present invention does not make direct contact with the magnetic tape. Tape movement is provided solely by controlled rotation of the take-up and supply reels. In this manner, the magnetic tape itself is not subject to direct driving contact. Further, in the present invention, the magnetic tape is not subjected to a tension or elongation force of a magnitude required to rotate the take-up or supply spools.

Further, the drive mechanism of the present invention overcomes the disadvantages associated with the prior art magnetic tape cassette drive mechanism having a metal yieldable resilient material drive interface. The thin, high durometer resilient material coated on the drive shaft interacts with the surface of the yieldable resilient material to provide a high friction positive drive interface. The high friction interface enables the coated drive shaft to continually grip, self clean, and roughen the surface of the yieldable resilient material.

By such interaction, the surface of the yieldable resilient material maintains sufficient surface friction and a polishing or shining action, which results from a metal yieldable resilient material interface is eliminated.

By using the teaching of the present invention, a magnetic tape cassette drive mechanism having a reliable positive drive shaft/driven wheel drive is possible thereby eliminating time base recording errors which are otherwise introduced into the recording scheme due to slippage of the drive mechanism. The improved drive mechanism of the present invention does not require continued maintenance in the form of cleaning, abrading or degreasing of the yieldable resilient material surface.

Therefore, it is an object of the present invention to provide an improved drive mechanism for a magnetic tape transport having a self cleaning, reliable friction driving surface.

It is another object of this invention to provide a highly reliable drive mechanism formed of a coated drive shaft and a driven wheel with a yieldable resilient material around its periphery adapted for use in a magnetic tape cassette transport.

BRIEF DESCRIPTION OF THE DRAWING

The foregoing and other objects, features and advantages of the invention will be apparent from the following description of the preferred embodiment of the invention when considered together with the illustrations in the accompanying drawings which include the following figures.

DESCRIPTION OF THE PREFERRED EMBODIMENT

Figures 1, 2, 3, 4, 5:
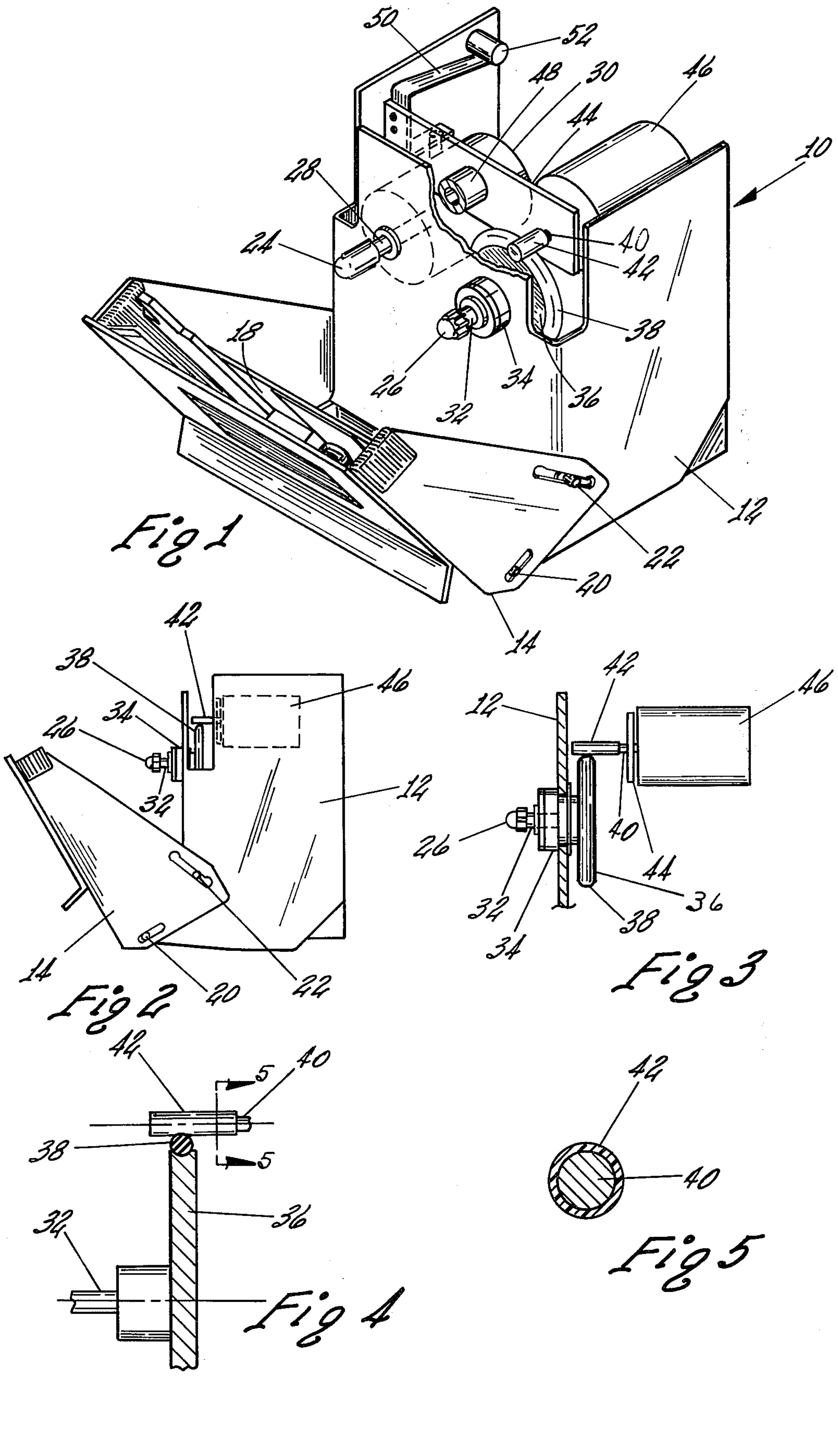
FIG. 1 is a perspective view of a magnetic tape cassette transport utilizing the drive mechanism of the present invention.
FIG. 2 is a side view of the magnetic tape cassette transport of FIG. 1.
FIG. 3 is a side view partially in cross-section of the drive mechanism of FIG. 2.
FIG. 4 is a fragmented side view partially in cross-section showing the drawing relationship between the coated drive shaft and drive wheel.
FIG. 5 is a cross-sectional view of the drive shaft having a thin, high durometer resilient material coating thereon taken on section line 5—5 of FIG. 4.

FIG. 1 is a prospective view of a tape transport, generally designated as 10, utilizing the teachings of this invention. Tape transport 10 comprises a support frame 12 which has pivotally mounted thereon a front plate 14. Front plate 14 is constructed to receive a tape cassette (not shown) having exterior dimensions of about 4 inches × 2½ inches × ⅝inches. The tape cassette is inserted into a receiving slot 18. When front plate 14 is urged forward, the bottom thereof rotates above pivot points 20 and 22.

The tape cassette includes two tape spools (not shown) which are rotatably mounted about spaced opening through the cassette. The interior surface of the spools have a plurality of radially inwardly directed teeth which are urged into driving engagement with hubs on spindle 24 and 26.

In the embodiment of FIG. 1, the hub 24 is connected to a drive shaft 28 rotatably mounted through the frame support 12. The drive shaft 28 is directly coupled to or forms an integral part of a tape drive motor 30. The drive motor is electrically controlled by a direction control circuit and servo controlled circuit (not shown) to directly drive the hub 24 and its associated tape spool in driving engagement therewith in a controlled direction and speed of rotation.

Hub 26 is coupled to a journaled shaft 32 which is rotatably mounted in a bearing 34 in support frame 12. Shaft 32 is fixedly connected to a circular shaped wheel member 36 having a yieldable resilient material around its periphery, such as, for example, a rubber O-ring 38. In the embodiment of FIG. 1, the periphery 38 of drive wheel 36 is a concave cross-section and is adapted to snugly receive the rubber O-ring 38.

A drive shaft 40 having a thin, hard resilient material coating 42 is positioned relative to the drive wheel 36 so as to make driving engagement with the rubber O-ring 38. The drive shaft 40 is coated with a thin, high durometer resilient material having a hardness of about 70 durometers to about 90 durometers. The preferred coating 42 is polyurethene.

A pivotally mounted bar 44 has the drive shaft 40 rotatably mounted therethrough. Drive shaft 40 is directly connected to a second drive motor 46. Drive motor 46 is also connected to direction control circuits and to servo control circuits (not shown) which electrically control the direction and speed of rotation of the motor 46. Pivot base 44 is adapted to be pivoted about pivot bearing 48. A spring member 50 is connected to the pivot bar 44 and extends to stop 52 mounted on the side of the support frame 12. A solenoid (not shown) is also connected to the support bar 44 directly below spring member 50. The solenoid, when controllably energized, causes the pivot bar 44 to rotate in a clockwise direction about pivot bearing 48 urging the coating 42 on drive shaft 40 into releasable driving engagement with the O-ring 38 on driven wheel 36. When the solenoid is de-energized, the spring member 50 urges the pivot bar 44 in a counter-clockwise direction about pivot bearing 48 moving coating 42 of drive shaft 40 out of driving engagement with the O-ring 38 on driven wheel 36.

FIG. 2 shows a side view of the support frame 12 having the front plate 14 in open position. Coating 42 is shown in driving engagement with O-ring 38. Coating 42 is mounted to be substantially perpendicular to the plane formed by O-ring 38.

FIG. 3 and FIG. 4 show in greater detail the driving relationship between the coating 42 on drive shaft 40 and the O-ring 38 on driven wheel 36. In this embodiment, coating 42 is formed onto the drive shaft 40 which shaft is integral with motor 46. Drive shaft 40 with coating 42 is spaced from and has its center axis substantially parallel to the center of rotation of the driven wheel 36 as shown in FIG. 4.

FIG. 4 shows in detail that the periphery of the driven wheel 36 has a generally concave cross-section. The dimension thereof is selected to accommodate the circular cross-section of O-ring 38.

FIG. 5 shows in detail the cross-section of the drive shaft 40 and coating 42 taken along section line 5—5 in FIG. 4. The coating 42 is relatively thin compared to the diameter of drive shaft 40.

In one embodiment, the diameter of the driven wheel 36 measured from the surface of O-ring 38 was about 1.625 inches. The diameter of the drive shaft 40 measured from the surface of the coating 42 was about 0.170 inches. Thus, in the preferred embodiment, the diameter of the driven wheel is about ten (10) times the diameter of the drive shaft.

The diameter of the drive shaft 40 in one application was 0.150 inches and the diameter of the drive shaft 40 and the coating 42 together was 0.170 inches. Thus, the thickness of the coating 42 is about 0.010 inches.

The preferred chemical composition of the coating 42 is a polyurethene having a hardness of about 70 durometers to 90 durometers on the Shore A scale. In one embodiment, a diamine cure polyurethene was used; namely Dupont Brand L-100 polyurethene. Similar polyurethenes of the same family may also be used.

One process or method used to form the polyurethene coating on the drive shaft is as follows. The surface of the metal shaft is cleaned of impurities by cleaning with steel wool by lightly abrading the surface with fine sandpaper or chemically cleaning. A clean, degreased metal surface is required for a good metal/polyurethene bond.

The uncured polyurethene material is cast onto the surface of the metal shaft. The thickness of the initial coating should be about 0.020 to about 0.030 inches. The polyurethene is then cured. Upon curing of the polyurethene, the polyurethene coating is then machined bringing the total diameter of the coated drive shaft to about 0.170 inches.

Although the preferred thickness of the polyurethene coating is about 0.010 inches, the thickness thereof can be increased. However, if the thickness approaches 0.025 inches or more, there is a tendency for the polyurethene to become spongy. Also, as the thickness of the coating is increased, the drive ratio between the coated drive shaft and the driven wheel having a yieldable resilient material on its periphery may change.

What is claimed is:

1. A drive mechanism for a cassette tape transport having a support frame comprising a first hub rotatably mounted in said frame;

a second hub spaced from and in alignment with said first hub rotatably mounted in said frame, said first hub and said second hub being adapted to drivingly engage tape spools of a tape cassette positioned in driving engagement with said hubs;

a first motor directly connected to and adapted to controllably rotate said first hub;

a driven wheel directly connected and adapted to rotate said second hub as said wheel is rotated, said driven wheel having its periphery coated with a yieldable resilient material;

a driving shaft having a thin, high durometer resilient material coating thereon and having a cross-sectional diameter which is less than the diameter of the driven wheel, said drive shaft being mounted to removably engage the periphery of said driven wheel and adapted to positively drive said driven wheel as said drive shaft is rotated, said coating being formed of a resilient material having a hardness of about 70 durometers to about 90 durometers; and a second motor directly connected to and adapted to controllably rotate said drive shaft which positively engages and drives said wheel through the resilient material coating and yieldable resilient material interface.

2. The tape drive mechanism of claim 1 wherein said yieldable resilient material on the periphery of said wheel is a rubber O-ring.

3. The tape drive mechanism of claim 2 wherein said thin, high durometer resilient material is polyurethene.

4. The tape drive mechanism of claim 3 wherein the coated drive shaft engaging said O-ring is spaced from and substantially parallel to the center of rotation of said driven wheel.

5. A drive mechanism adapted for use in a magnetic tape cassette transport having a support frame comprising a first hub rotatably mounted in said frame;

a second hub spaced from and in alignment with said first hub rotatably mounted in said frame, said first hub and said second hub being adapted to drivingly engage tape spools of a tape cassette;

a driven wheel operatively coupled to and adapted to rotate said second hub as said wheel is rotated, said drive wheel having its periphery coated with a yieldable resilient material; and a driving shaft having a thin, high durometer resilient material coating thereon and having a cross-sectional diameter which is less than the diameter of the driven wheel, said coated drive shaft being positioned to have its thin resilient material coating removably engage the yieldable resilient material of said wheel and positively drive said driven wheel as said drive shaft is rotated, said coating being formed of a resilient material having a hardness of about 70 durometers to about 90 durometers.

6. The drive mechanism of claim 5 wherein said yieldable resilient material is a rubber O-ring.

7. The drive mechanism of claim 5 wherein said resilient material coating is polyurethene.

8. The drive mechanism of claim 5 wherein the coated drive shaft engaging said driven wheel yieldable resilient material is spaced from and substantially parallel to the center of rotation of the driven wheel.

9. The drive mechanism of claim 7 wherein the thickness of said polyurethene coating is about 0.010 inches.

10. A drive mechanism for a cassette tape transport having a support frame comprising a first hub rotatably mounted in said frame;

a second hub spaced from and in alignment with said first hub rotatably mounted in said frame, said first hub and said second hub being adapted to drivingly engage tape spools of a tape cassette positioned in driving engagement with said hubs;

a first motor directly connected to and adapted to controllably rotate said first hub;

a driven wheel directly connected and adapted to rotate said second hub as said wheel is rotated;

a driving shaft mounted to removably engage the periphery of said driven wheel;

a thin, high durometer resilient material drive layer formed into an endless loop and positioned between the driven wheel and the driving shaft, said drive layer being formed of a resilient material having a hardness of about 70 durometers to about 90 durometers, said endless loop drive layer being responsive to movement of the driving shaft to engage and transport said driven wheel through a driving interface including said drive layer; and a second motor directly connected to and adapted to controllably rotate said driving shaft which positively engages and drives said driven wheel through the driving interface including said drive layer therebetween.

11. The drive mechanism of claim 10 wherein said drive layer is polyurethene.

* * * * *